(12) United States Patent
Harada et al.

(10) Patent No.: US 7,871,586 B2
(45) Date of Patent: Jan. 18, 2011

(54) MERCURY REMOVAL SYSTEM AND METHOD

(75) Inventors: Masahiro Harada, Tokyo (JP); Makoto Susaki, Tokyo (JP); Shintaro Honjo, Hiroshima-ken (JP); Shuji Kameyama, Toyko (JP); Masaki Nakahara, Tokyo (JP); Akira Kisei, Tokyo (JP)

(73) Assignees: Mitsubishi Heavy Industries, Ltd., Tokyo (JP); Clean Coal Power R&D Co., Ltd., Iwaki-shi (JP); Hokkaido Electric Power Company, Inc., Sapporo-shi (JP); Tohoku Electric Power Co., Inc., Sendai-shi (JP); The Tokyo Electric Power Company Inc., Tokyo (JP); Chubu Electric Power Co., Inc., Nagoya-shi (JP); Hokuriku Electric Power Company, Toyama-shi (JP); The Kansai Electric Power Co., Inc., Osaka-shi (JP); The Chugoku Electric Power Co., Inc., Hiroshima-shi (JP); Shikoku Electric Power Co., Inc., Takamatsu-shi (JP); Kyushu Electric Power Co., Inc., Fukuoka-shi (JP); Central Research Institute of Electric Power Industry, Tokyo (JP)

( * ) Notice: Subject to any disclaimer, the term of this patent is extended or adjusted under 35 U.S.C. 154(b) by 0 days.

(21) Appl. No.: 11/921,683

(22) PCT Filed: Jun. 9, 2006

(86) PCT No.: PCT/JP2006/311587
§ 371 (c)(1),
(2), (4) Date: Apr. 6, 2009

(87) PCT Pub. No.: WO2006/132347
PCT Pub. Date: Dec. 14, 2006

(65) Prior Publication Data
US 2009/0304563 A1 Dec. 10, 2009

(30) Foreign Application Priority Data
Jun. 9, 2005 (JP) .............................. 2005-169167

(51) Int. Cl.
B01D 53/64 (2006.01)
B01D 53/74 (2006.01)
(52) U.S. Cl. .................... 423/210; 422/168; 96/155; 96/181; 95/134
(58) Field of Classification Search ................ 423/210; 422/168; 96/155, 181; 95/134
See application file for complete search history.

(56) References Cited

U.S. PATENT DOCUMENTS

| 4,142,875 A | 3/1979 | Bohmholdt et al. |
| 2003/0082085 A1* | 5/2003 | Harada et al. ............... 423/210 |

FOREIGN PATENT DOCUMENTS

JP 51-131164 A * 11/1976

(Continued)

*Primary Examiner*—Timothy C Vanoy
(74) *Attorney, Agent, or Firm*—Birch, Stewart, Kolasch & Birch, LLP

(57) ABSTRACT

The present invention provides a mercury removal system and method for effectively removing a mercury component, which is present in a gas stream in an extremely small amount in wet gas cleaning. The mercury removal system in wet gas cleaning includes a water washing tower for introducing therein a target gas containing a mercury component and transferring the mercury component into an absorbing solution, a flash drum (10) for flashing the absorbing solution discharged from the water washing tower to separate the absorbing solution into a gas component and waste water, an oxidation treatment means (1) for adding an oxidizing agent to the absorbing solution at the preceding stage of the flash drum, and a waste water treatment means for subjecting to coagulation sedimentation treatment the separated waste water containing the mercury component at the following stage of the flash drum to dispose of the mercury component as sludge.

12 Claims, 4 Drawing Sheets

FOREIGN PATENT DOCUMENTS

| | | |
|---|---|---|
| JP | 52-111906 A | 9/1977 |
| JP | 58-196888 A * | 11/1983 |
| JP | 10-287885 A | 10/1998 |
| JP | 2003-138277 A | 5/2003 |

* cited by examiner

1: OXIDATION TREATMENT
10: FLASH DRUM
11: HC TREATMENT
12: NH₃ STRIPPING
13: WASTE WATER TREATMENT
20: OFFGAS FURNACE
21: QC/EP
22: FGD

5: COAGULATING SEDIMENTATION TREATMENT

10: FLASH DRUM
25: ACTIVATED CHARCOAL

10: FLASH DRUM
31: GAS COOLING TOWER
32: GAS SCRUBBING TOWER
35: H$_2$S ABSORPTION TOWER
36: ABSORBING SOLUTION REGENERATION TOWER

MERCURY REMOVAL SYSTEM AND METHOD

TECHNICAL FIELD

The present invention relates to a mercury removal system and method in wet gas cleaning for removing a mercury component in gas. More particularly, it relates to a mercury removal system and method for effectively removing a mercury component which is present in a gas stream in an extremely small amount in wet gas cleaning used for coal or heavy oil gasification, petroleum refining and the like.

BACKGROUND ART

An integrated gasification combined cycle (hereinafter abbreviated to IGCC) is an electric power generation system in which a fossil fuel such as coal, heavy oil, petroleum residue oil, petroleum coke, and orimulsion is gasified by using a partial oxidation process to produce a synthetic gas mainly containing CO and $H_2$ which is used as a raw material in combined cycle power generation equipment to generate electric power. Exemplary systems include a coal-utilized high-efficiency power generation plant in which an air-blast two-stage entrained bed gasification furnace, wet gas cleaning equipment, and a gas turbine are combined. The IGCC is a system in which the economical efficiency and reliability are improved significantly by achieving simplification and rationalization as power generation equipment. In the IGCC, the efficiency is increased by 10 to 20% as compared with the conventional electric power generation system. In addition, the $CO_2$ emission in the IGCC can be reduced by the same percentage. Further, in the IGCC, handling of ash is easy, because the ash is converted into slag, thus reducing the volume of ash, and it has non-elution property.

In general, flue gas from an existing thermal electric power plant contains mercury derived from coal. Such mercury cannot be removed completely by an ordinary flue gas treatment system (e.g., electrical dust precipitator, wet flue gas desulfurizer, and etc.). Accordingly, some mercury is emitted unless some measures are taken. Mercury is present in gas in a minute amount, and has a very high vapor pressure. In particular, metallic mercury has a property of being insoluble in water. Therefore, it is difficult to completely remove mercury even by recovering it with a dust precipitator or by washing it with a scrubber.

In gas cleaning or refining in the IGCC, for example, approximately 70% of Hg in coal gas can be removed by a water washing process. However, when an absorbing solution used in the water washing process is decompressed from a high pressure to the normal pressure, Hg may be flashed out of the solution and be discharged into an offgas (for example, refer to Japanese Patent Application Publication No. 2003-138277).

In order to remove the mercury discharged into the offgas, a method for adsorbing mercury into activated charcoal to remove it from the offgas has been proposed. FIG. 3 shows a schematic configuration of mercury removal equipment using activated charcoal.

In this equipment, waste water containing mercury sent from a cooling tower is decompressed in a flash drum 10 and is separated into gas and liquid. At this time, most of mercury is separated in a form of being contained in the gas component. This gas component is burned in an offgas furnace 20, and thereafter is treated while flowing down in the order of a dust precipitator (QC/EP) 21 and a flue gas desulfurizer (FGD) 22. The flue gas subjected to flue gas desulfurization passes through an activated charcoal 25 before being discharged, by which harmful components including mercury contained in the flue gas are adsorbed and removed.

The liquid component separated in the flash drum 10 contains an oil content such as tar in the refining of product gas yielded by using, for example, coal etc. as a raw material. Therefore, oil-liquid separation treatment (HC treatment) is performed by using kerosene etc., and the oil content is sent to the offgas furnace 20 as some of fuel. The separated waste water content is subjected to ammonia ($NH_3$) stripping treatment 12 to remove an ammonia content, further being subjected to waste water treatment for removing harmful components as sludge, and is discharged after the waste water treatment.

However, in the conventional method using activated charcoal, activated charcoal must be provided in all lines of generated offgas, so that this method has a problem in that the number of provided activated charcoals increases though the quantity of treated gas is small. Also, the conventional method has many drawbacks in term of maintenance because a location that is unsuitable for the provision of activated charcoal and a location in which activated charcoal cannot be exchanged during operation are included.

Patent Document 1: Japanese Patent Application Publication No. 2003-138277

DISCLOSURE OF THE INVENTION

Problems to be Solved by the Invention

To solve the above-described problems, the inventors conducted studies earnestly to develop a method in which mercury, which is a component present in a gas in a minute amount, can be removed effectively and efficiently, and also an operation for removing a mercury component in a gas by using activated charcoal etc. during the operation of the system is avoided, by which the removal operation and the maintenance and control of removal performance can be made simple and easy.

As the result, the inventors found the fact that mercury can be removed while the above-described problems are solved by constructing a system in which after, for example, coal gas has been water-washed under a high pressure, mercury present in waste water is immobilized before the waste water is decompressed, and mercury does not flash to the offgas side though decompression is accomplished. If a specific component coexists in a gasified gas, most of metallic mercury transfers into water, and the captured mercury is discharged into the gas when the water is decompressed (flashed). Therefore, in wet gas cleaning, even if mercury is transferred into an absorbing solution and is removed in the water washing step, and at the same time, the waste water containing mercury captured in the water washing step is returned from under the high pressure to under the normal pressure, mercury must be removed so as not to be discharged into the gas. The present invention was completed in the above-described point of view.

Means for Solving the Problems

A first feature of the present invention provides, as a method for immobilizing mercury in waste water, a method in which mercury is oxidized by adding an oxidizing agent (NaClO, etc.) to the waste water before being flashed and is allowed to remain in the solution as mercury ions and is immobilized, and a mercury component is discharged to the outside of system as sludge by coagulation sedimentation after decompression. Specifically, the present invention provides a mercury removal system in wet gas cleaning, including a water washing tower for introducing a target gas containing a mercury component and transferring the mercury component into an absorbing solution, and a flash drum for flashing the absorbing solution discharged from the water washing tower to separate the absorbing solution into a gas component and waste water, characterized in that the system further includes an oxidation treatment means for adding an oxidizing agent to the absorbing solution at the preceding stage of the flash drum, and a waste water treatment means for discharging the mercury component contained in the separated waste water by coagulation sedimentation treatment at the following stage of the flash drum. The water washing tower is usually divided into a gas cooling tower and a gas scrubbing tower. Also, the flashing of absorbing solution can be performed, for example, by spraying the absorbing solution under a low pressure.

The mercury removal method in wet gas cleaning using the above-described system includes a water washing step of introducing a target gas containing a mercury component and transferring the mercury component into an absorbing solution, and a flash step of flashing the absorbing solution discharged from the water washing step to separate the absorbing solution into a gas component and waste water, and further includes an oxidation treatment step of adding an oxidizing agent on the upstream side of the flash step, and a waste water treatment step of discharging the mercury component contained in the separated waste water as some of sludge by coagulation sedimentation treatment on the downstream side of the flash step. As the mercury treatment method, it is preferable that the mercury component be dissolved sufficiently in the absorbing solution by allowing the mercury component to coexist with hydrogen sulfide, for example, under a pressure of 0.2 to 5.0 MPa in the aforementioned water washing step.

According to the present invention, mercury is oxidized by adding the oxidizing agent to the waste water before being flashed, and thereby mercury ions are immobilized in the solution. Then, the mercury immobilized in the solution is coagulatingly precipitated in the waste water treatment step. Also, since the addition of oxidizing agent in the oxidation treatment step can be accomplished by using a liquid, pumping-up can be performed, so that the operation is easy to perform. Further, since the mercury component does not transfer into the gas in the flash step, an activated charcoal for flue gas treatment is not needed in the system.

A second feature of the present invention provides, as a method for immobilizing mercury in waste water, a method in which a coagulant aid is added in the waste water before being flashed, and coagulation sedimentation treatment is performed to discharge the mercury component from the waste water to the outside of system as sludge. Specifically, the present invention provides a mercury removal system in wet gas cleaning, including a water washing tower for introducing a target gas containing a mercury component and transferring the mercury component into an absorbing solution, and a flash drum for flashing the absorbing solution discharged from the water washing tower to separate the absorbing solution into a gas component and waste water, characterized in that the system further includes a coagulation sedimentation treatment means for removing the mercury component from the absorbing solution as some of sludge by adding a coagulant aid at the preceding stage of the flash drum. The water washing tower is usually divided into a gas cooling tower and a gas scrubbing tower. Also, the flashing of absorbing solution can be performed, for example, by spraying the absorbing solution under a low pressure.

The mercury removal method in wet gas cleaning using the above-described system includes a water washing step of introducing a target gas containing a mercury component and transferring the mercury component into an absorbing solution, and a flash step of flashing the absorbing solution discharged from the water washing step to separate the absorbing solution into a gas component and waste water, and further includes a coagulation sedimentation step of removing the mercury component from the absorbing solution as some of sludge by adding a coagulant aid to the absorbing solution on the upstream side of the flash step. In the water washing step, it is preferable that the mercury component be dissolved sufficiently in the absorbing solution by allowing the mercury component to coexist with hydrogen sulfide, for example, under a pressure of 0.2 to 5.0 MPa.

According to the present invention, since the coagulation sedimentation is accomplished in the waste water before being flashed, other heavy metal components are also removed by coagulation sedimentation as a side effect. Therefore, the coagulation sedimentation in the waste water treatment on the downstream side can be alleviated. By the coagulation sedimentation of mercury accomplished by adding the coagulant aid to the waste water before being flashed, the mercury component is discharged as some of sludge. The waste water having been subjected to coagulation sedimentation treatment is subjected to ammonia stripping treatment after HC treatment. In addition, since mercury is not transferred into the gas in the flash step, an activated charcoal for flue gas treatment is not needed in the system.

In the present invention, there is provided, in addition to the above-described systems, a mercury removal system further including a hydrogen sulfide absorption tower for introducing a water-washed gas sent from the water washing tower and absorbingly removing hydrogen sulfide by using the absorbing solution containing an amine compound, and a second flash drum for flashing the absorbing solution discharged from the hydrogen sulfide absorption tower to separate the absorbing solution into a gas component and an absorbing solution sent to a regeneration tower. Also, there is provided, in addition to the above-described methods, a mercury removal method further including a hydrogen sulfide absorption step of introducing a water-washed gas sent from the water washing step and absorbingly removing hydrogen sulfide by using the absorbing solution containing an amine compound, and a second flash step of flashing the absorbing solution discharged from the hydrogen sulfide absorption step to separate the absorbing solution into a gas component and an absorbing solution sent to the regeneration tower.

Also, as the target gas, in addition to a product gas obtained by gasifying a fossil fuel by a gasification furnace, a flue gas discharged by the combustion of fossil fuel in a combustion furnace can also be used.

Advantages of the Invention

According to the mercury removal system in accordance with the present invention, mercury, which is a component present in a gas in a minute amount, can be removed effectively and efficiently, and also an operation for removing a mercury component in the gas by using activated charcoal etc. during the operation of the system is avoided. That is to say, an activated charcoal need not be provided in all of offgas lines to prevent the mercury component from being contained in offgas, and the activated charcoal can be prevented from being provided in a location under a high pressure, which is unsuitable for the provision, or in a location in which the exchange of activated charcoal cannot be accomplished during operation. Even if the system is operated for a long period of time, the deterioration in performance of adsorbent and the need for exchange thereof do not arise, so that the maintenance is very easy to perform.

Thus, according to the present invention, mercury, which is a component present in a gas in a minute amount, can be removed effectively and efficiently, and the cost of mercury removal incurred by the operation of system can be reduced.

BEST MODE FOR CARRYING OUT THE INVENTION

For a wet gas cleaning method in accordance with the present invention, specific embodiments will now be described by reference to the accompanying drawings.

First Embodiment

Figure 1:
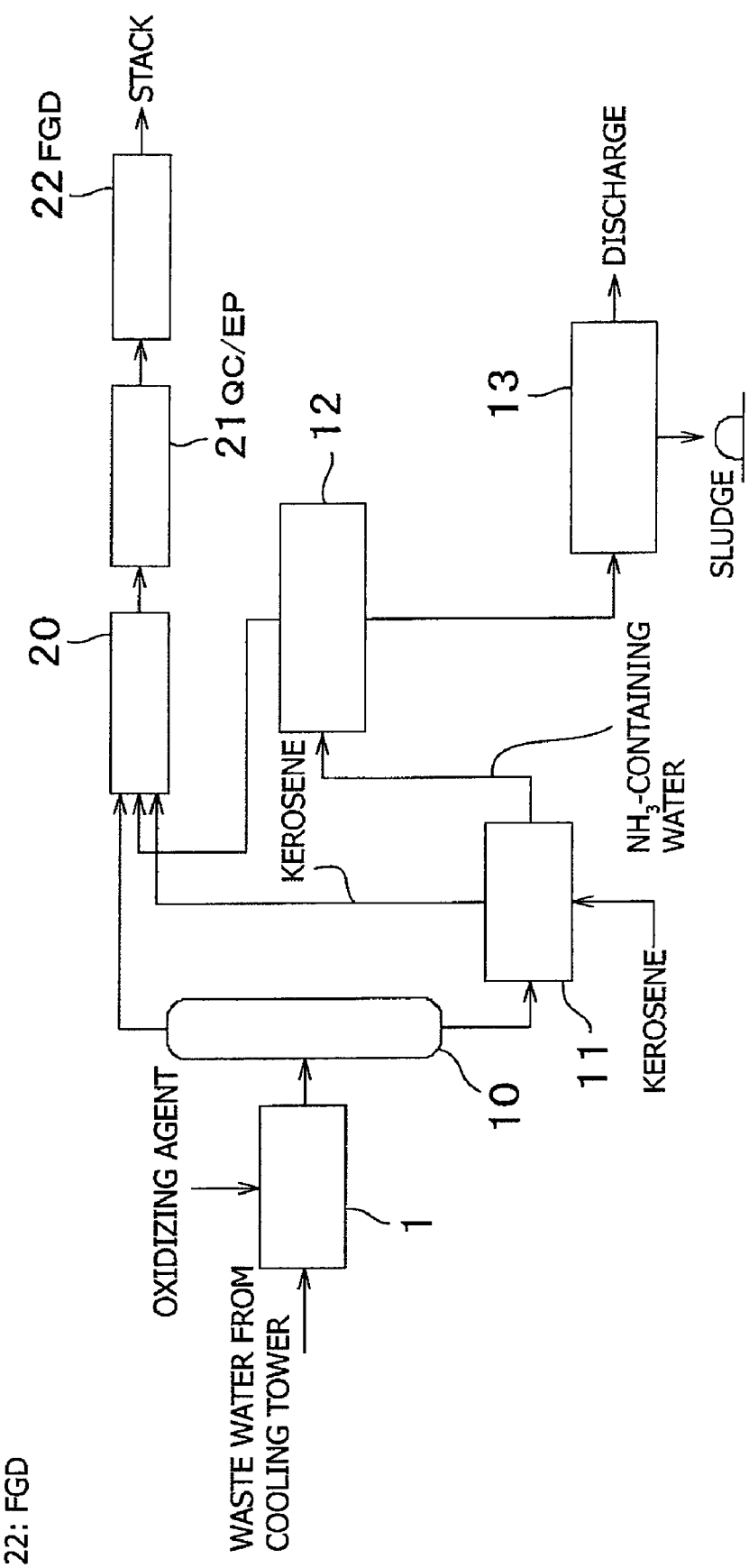
FIG. 1 is a schematic configuration diagram showing a preferred embodiment of a mercury removal system in wet gas cleaning in accordance with the present invention.
Figure 4:
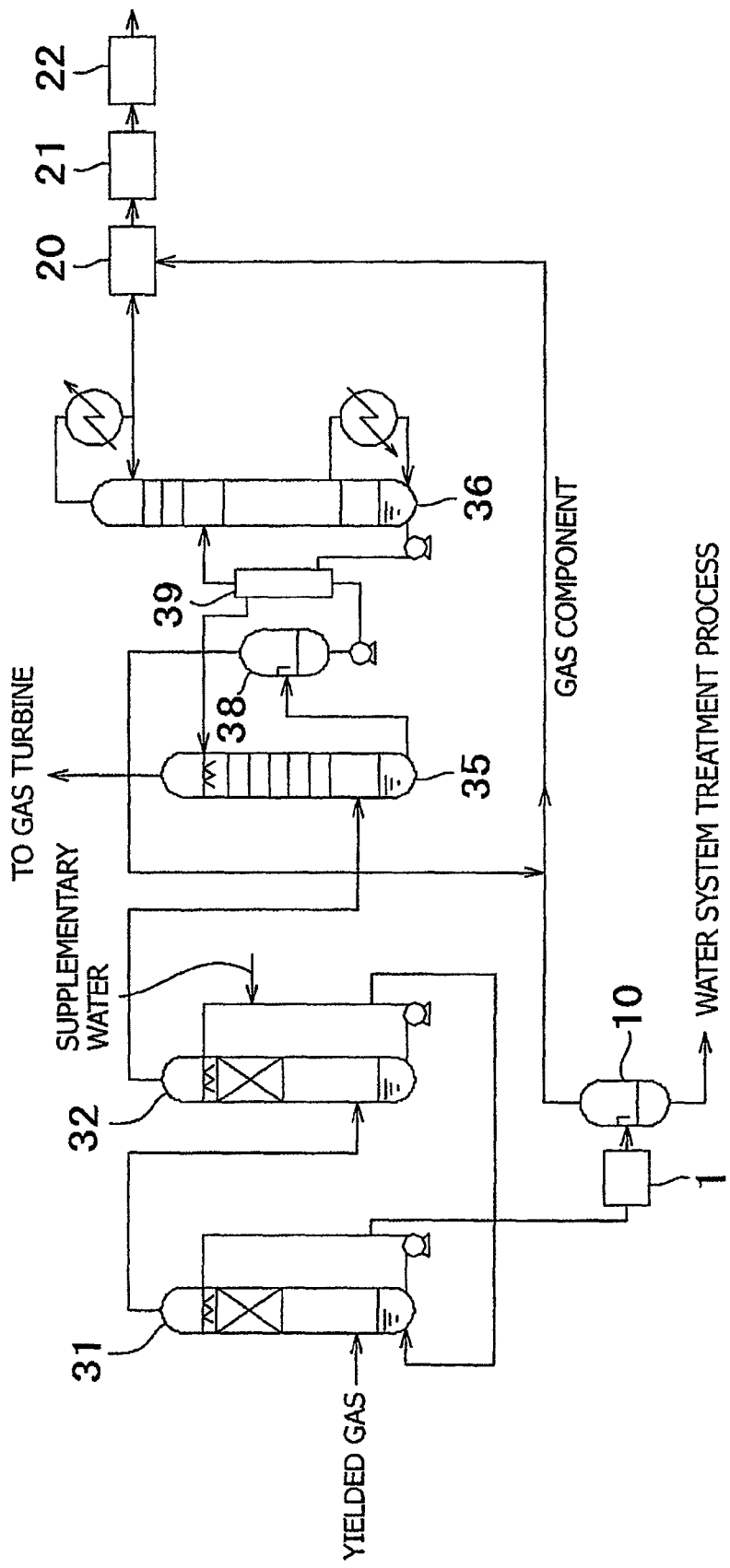
FIG. 4 is a schematic configuration diagram showing an example of a conventional mercury removal system in wet gas cleaning.

FIGS. 1 and 4 schematically show a preferred embodiment of a system for carrying out a mercury removal method in wet gas cleaning in accordance with a first embodiment.

First, a product gas shown in FIG. 4 is obtained by gasifying a raw material such as coal, petroleum, residue oil, and biomass in a gasification furnace (not shown). The gas yielded in the gasification furnace contains a mercury component in a minute amount depending on the raw material. The product gas containing the mercury component is introduced into a water washing tower to transfer the mercury component into an absorbing solution.

In the system in accordance with this embodiment, the water washing tower consists of a gas cooling tower 31 and a gas scrubbing tower 32. In the gas cooling tower 31 and a gas scrubbing tower 32, cooling and scrubbing steps are carried out. Water for absorbing an ammonia component in the gas is charged, for example, into the gas scrubbing tower 32. By these two water washing towers, ammonia in the gas is absorbed into the absorbing solution and is removed. The water charged into the gas scrubbing tower 32 is circulated by a pump so as to act as the absorbing solution for absorbing ammonia, and some of the water is sent to the gas cooling tower 31 provided at the preceding stage in the gas flow direction, and is circulated in the tower by a pump. In the present invention, the cooling and scrubbing steps may be carried out in one water washing tower.

In the water washing step for removing ammonia as described above, in the case where the mercury component is contained in the gas introduced, the mercury component transfers into the absorbing solution under pressure in the water washing tower (cooling water tower and scrubbing tower). At this time, the transfer of the mercury component into the absorbing solution is influenced by the temperature, so that the removal ratio of mercury in the gas increases as the solution temperature decreases. Therefore, the removal ratio is influenced by the temperatures of the gas cooling tower 31 and the gas scrubbing tower 32. If the temperature of the gas scrubbing tower 32 at the following stage is low, the removal ratio increases. The gas scrubbing tower 32 is preferably operated usually at a temperature not higher than 50° C., preferably not higher than 40° C., from the viewpoint of a hydrogen sulfide absorbing tower.

Next, to the absorbing solution (waste water) containing mercury that is discharged from the cooling tower in the water washing step, an oxidizing agent is added by an oxidation treatment means 1 (oxidation treatment step) before the decompression flash in a flash drum 10. The kind of the oxidizing agent is not subject to any special restriction. Any oxidizing agent that can convert metallic mercury (Hg) into a form of mercury ions ($Hg^{2+}$) can be used widely. For example, as the oxidizing agent for converting metallic mercury into a form of mercury chloride, sodium hypochlorite (NaOCl), hydrogen peroxide ($H_2O_2$), potassium manganate peroxide ($KMnO_4$), and the like are preferable.

Mercury exists mainly in two forms of metallic mercury Hg of 0 value and mercury chloride $HgCl_2$. Whereas metallic mercury of 0 value is insoluble in water, mercury chloride dissolves in water. Therefore, if mercury is converted into a form of mercury chloride, the mercury component can remain in waste water even after decompression. For this reason, the metallic mercury of 0 value is oxidized into mercury chloride by using the oxidizing agent.

The added amount of oxidizing agent is not subject to any special restriction. For example, sodium hypochlorite in the range of about 0.05 to 0.5 g is preferably added to one litter of absorbing solution. The addition of oxidizing agent in the oxidation treatment step can be accomplished by using a liquid containing the aforementioned oxidizing agent, so that the operation by pumping-up can be performed easily even when the addition is accomplished under pressure. Also, the addition of oxidizing agent can be controlled by pH and oxidation-reduction potential (ORP). The operation performed by adding the oxidizing agent in the pH range of 5 to 7 and in the ORP range of 200 to 300 mV is preferable.

In the oxidation treatment step, mercury is oxidized by adding the oxidizing agent to the waste water under pressure (0.2 to 5.0 MPa), by which mercury ions can be immobilized in the solution.

Next, in the flash drum 10, the absorbing solution supplied from the oxidation treatment means 1 is flashed under a low pressure (normal pressure). Thereby, the absorbing solution is separated into a gas component and waste water. At this time, in this embodiment, the mercury component remains in the solution as mercury ions as described above, so that the mercury component is contained in the waste water.

Generally, in the refining treatment system, since the absorbing solution discharged from the water washing step is under a high pressure, various gases are also dissolved in the absorbing solution. To treat such waste water, the waste water is decompressed through the flash drum 10 and is released from the high pressure. Thereby, the dissolved gasses are once flashed and dissipated into the gas. The remaining waste water is sent to a water system treatment step.

The waste water separated in the flash drum 10 contains an oil content such as tar in the refining of product gas yielded, for example, by using coal as a raw material. Therefore, oil-liquid separation treatment (HC treatment) 11 is performed by using kerosene etc., and the oil content is sent to the offgas furnace 20 as some of fuel. The separated waste water content is subjected to ammonia (NH$_3$) stripping treatment 12 to remove an ammonia content.

Further, the waste water content is sent to a waste water treatment means 13 for performing coagulation sedimentation treatment after a precipitant of heavy metal, such as a chelating agent, has been added. By the aforementioned oxidation treatment step 1, since the mercury component is also contained in the waste water, the mercury component is subjected to coagulation sedimentation treatment as some of sludge by the waste water treatment means 13, and is separated from the waste water. The waste water from which harmful components are removed as sludge is discharged after the waste water treatment 13.

On the other hand, the gas component separated in the flash drum 10 does not contain the mercury component. Therefore, a device such as activated charcoal need not be provided in the flow path of gas component. The gas component flows down in the order of an offgas furnace 20, a dust precipitator (QC/EP) 21, and a flue gas desulfurizer 22, and is discharged from a stack.

The mercury removal system in this embodiment shown in FIG. 4 is a system in which the water-washed gas sent from the water washing tower to a hydrogen sulfide absorption tower 35 is sent.

In the aforementioned water washing step for removing ammonia, the mercury component transfers from the gas containing mercury into the absorbing solution. The water-washed gas from which the mercury component has been removed is sent to the following stage of the wet gas cleaning system. At the following stage of the water washing step, a hydrogen sulfide removal step for removing hydrogen sulfide in the gas is provided, and in this step, hydrogen sulfide in the gas is removed. The hydrogen sulfide removal step is usually made up of the hydrogen sulfide absorption tower 35 and an absorbing solution regeneration tower 36. The water-washed gas sent from the water washing step is introduced into the hydrogen sulfide absorption tower 35.

The main objective of the hydrogen sulfide absorption tower 5 is to absorb and remove hydrogen sulfide by using the absorbing solution containing amine. In the hydrogen sulfide absorption tower 35, a hydrogen sulfide component in the absorbing solution is transferred under pressure from the gas containing hydrogen sulfide (water washing step). The absorbing solution discharged from the hydrogen sulfide absorption tower 35 is flashed under a low pressure in a second flash drum 38, and is separated into a gas component and an absorbing solution sent to the regeneration tower 36. On the other hand, the gas refined in the hydrogen sulfide absorption tower 35 is sent to a gas turbine.

Second Embodiment

Figure 2:
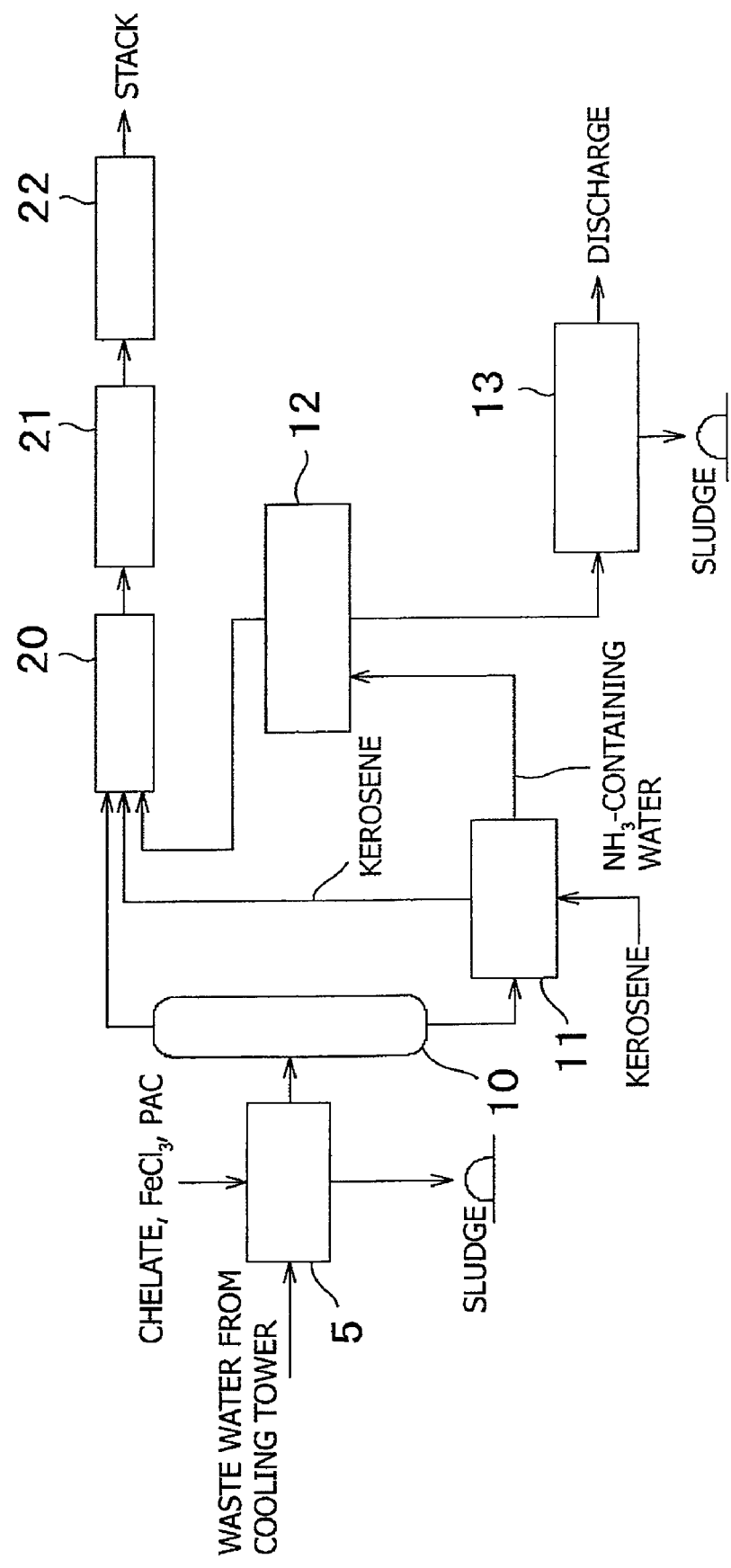
FIG. 2 is a schematic configuration diagram showing another preferred embodiment of a mercury removal system in wet gas cleaning in accordance with the present invention.
Figure 3:
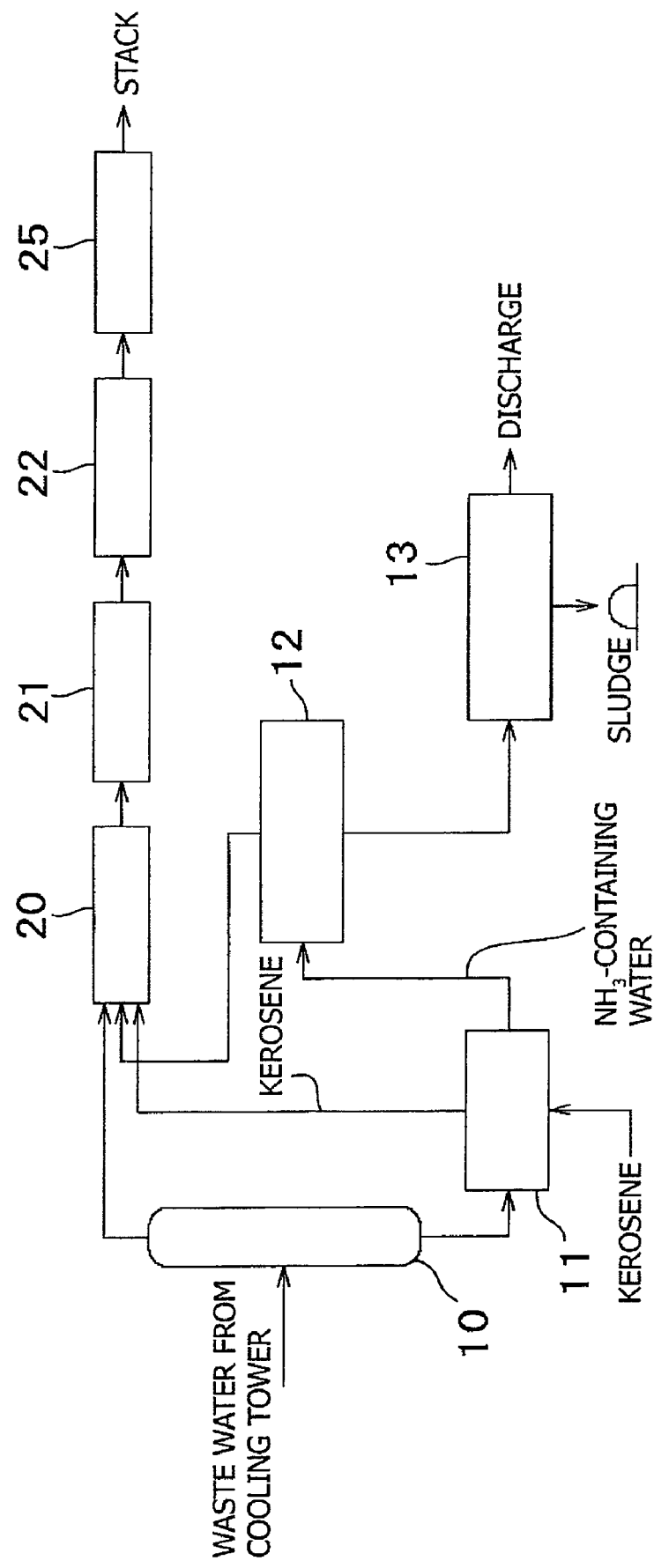
FIG. 3 is a schematic configuration diagram showing an embodiment of the entire configuration of a mercury removal system in wet gas cleaning.

FIG. 2 schematically shows an example of a system suitable for carrying out a mercury removal method in wet gas cleaning in accordance with a second embodiment. In this embodiment as well, the system components are the same.

In the system in accordance with this embodiment, to the absorbing solution (waste water) containing mercury, which is discharged from the cooling tower in the water washing step, a coagulant aid is added by a coagulation sedimentation treatment means 5 (coagulation sedimentation step) before the decompression flash in the flash drum 10. The kind of the coagulant aid is not subject to any special restriction. Any compound capable of coagulatingly precipitating metallic mercury (Hg) can be used widely. For example, a chelating agent, iron salts (FeCl$_3$, Fe$_2$(SO$_4$)$_3$), PAC (poly-aluminum chloride), and the like are preferable. As the chelating agent, a dithiocarbanic acid type chelate resin, a thiol type chelate resin, and the like can be cited. The added amount of coagulant aid is also not subject to any special restriction. For example, a chelating agent in the range of 0.1 to 20 mg is preferably added to one litter of absorbing solution.

By this addition of coagulant aid in the coagulation sedimentation step, the mercury component can be removed as some of sludge from the absorbing solution under a pressure (0.2 to 5.0 MPa).

Next, in the flash drum 10, the absorbing solution supplied from the coagulation sedimentation treatment means 5 is flashed under a low pressure (normal pressure). Thereby, the absorbing solution is separated into a gas component and waste water. At this time, in this embodiment, since the mercury component has already been removed by coagulation sedimentation as described above, the mercury component does not remain in both of the gas component and the waste water.

The waste water separated in the flash drum 10 contains an oil content such as tar in the refining of product gas yielded, for example, by using coal as a raw material. Therefore, oil-liquid separation treatment (HC treatment) 11 is performed by using kerosene etc., and the oil content is sent to the offgas furnace 20 as some of fuel. The separated waste water content is subjected to ammonia (NH$_3$) stripping treatment 12 to remove an ammonia content.

The waste water from which the ammonia content has been removed by the ammonia stripping treatment 12 can be discharged without especially being subjected to waste water treatment. If necessary, as shown in FIG. 2, this waste water can be sent further to the waste water treatment means 13 for performing coagulation sedimentation under the normal pressure after a precipitant of heavy metal, such as a chelating agent, has been added. For the waste water under a high pressure, since metals such as the mercury component have already been removed by the aforementioned coagulation sedimentation treatment means 5, the load of coagulation sedimentation treatment in the waste water treatment means 13 is alleviated. Therefore, in this embodiment, the equipment capacity in the waste water treatment step can be reduced.

By the coagulation sedimentation under normal pressure in the waste water treatment step, a heavy metal component is separated from the waste water as some of sludge. The waste water from which harmful components have been removed as sludge is discharged at the following stage of the waste water treatment means 13.

On the other hand, the gas component separated in the flash drum 10 does not contain the mercury component. Therefore, a device such as activated charcoal need not be provided in the flow path of gas component. The gas component flows down in the order of the offgas furnace 20, the dust precipitator (QC/EP) 21, and the flue gas desulfurizer 22, and is discharged from the stack.

The above is a description of the embodiments in accordance with the present invention. The present invention is not limited to the above-described embodiments, and various modifications and changes can be made without departing from the spirit and scope of the present invention.

INDUSTRIAL APPLICABILITY

According to the mercury removal method in accordance with the present invention, in the operation of system as well, an adsorbent such as activated charcoal is not needed at all, so that the operation need not be stopped because of the exchange of adsorbent. Also, as compared with the case where the product gas is treated as it is, the treatment is easy to perform because the mercury component absorbed in solution is treated, and the operation cost involved in the treatment can be reduced. Therefore, an efficient system operation can be performed while mercury is removed, so that the industrial significance of the present invention is very great.

The invention claimed is:

1. A mercury removal system in wet gas cleaning, comprising a water washing tower for introducing thereinto a target gas containing a mercury component and transferring the mercury component into an absorbing solution, and a flash drum for flashing the absorbing solution discharged from the water washing tower to separate the absorbing solution into a gas component and waste water,
characterized in that the system further comprises an oxidation treatment means for adding an oxidizing agent to the absorbing solution at the preceding stage of the flash drum, and a waste water treatment means for subjecting to coagulation sedimentation treatment the separated waste water containing the mercury component at the following stage of the flash drum to dispose of the mercury component as sludge.

2. A mercury removal system in wet gas cleaning, comprising a water washing tower for introducing thereinto a target gas containing a mercury component and transferring the mercury component into an absorbing solution, and a flash drum for flashing the absorbing solution discharged from the water washing tower to separate the absorbing solution into a gas component and waste water,
characterized in that the system further comprises a coagulation sedimentation treatment means for adding a coagulant aid to the absorbing solution at the preceding stage of the flash drum to remove the mercury component from the absorbing solution as sludge.

3. The mercury removal system according to claim 1, characterized in that the system further comprises
a hydrogen sulfide absorption tower for introducing thereinto a water-washed gas sent from the water washing tower and absorbingly removing hydrogen sulfide from the water-washed gas by using an absorbing solution containing an amine compound, and
a second flash drum for flashing the absorbing solution discharged from the hydrogen sulfide absorption tower to separate the absorbing solution into a gas component and an absorbing solution to be sent to a regeneration tower.

4. The mercury removal system according to claim 1, characterized in that the target gas is a product gas obtained by gasifying a fossil fuel by a gasification furnace.

5. A mercury removal method in wet gas cleaning, comprising a water washing step of introducing a target gas containing a mercury component into an absorbing solution and transferring the mercury component from the target gas into the absorbing solution, and a flash step of flashing the absorbing solution discharged from the water washing step to separate the absorbing solution into a gas component and waste water,
characterized in that the method further comprises an oxidation treatment step of adding an oxidizing agent to the absorbing solution at the upstream of the flash step, and a waste water treatment step of subjecting to coagulation sedimentation treatment the separated waste water containing the mercury component at the downstream of the flash step to dispose of the mercury component as sludge.

6. A mercury removal method in wet gas cleaning, comprising a water washing step of introducing a target gas containing a mercury component into an absorbing solution and transferring the mercury component from the target gas into the absorbing solution, and a flash step of flashing the absorbing solution discharged from the water washing step to separate the absorbing solution into a gas component and waste water,
characterized in that the method further comprises
a coagulation sedimentation step of adding a coagulant aid to the absorbing solution at the upstream of the flash step to remove the mercury component from the absorbing solution as sludge.

7. The mercury removal method according to claim 5, characterized in that the method further comprises
a hydrogen sulfide absorption step of absorbingly removing hydrogen sulfide from a water-washed gas sent and introduced from the water washing step by using an absorbing solution containing an amine compound, and
a second flash step of flashing the absorbing solution discharged from the hydrogen sulfide absorption step to separate the absorbing solution into a gas component and an absorbing solution to be sent to a regeneration tower.

8. The mercury removal method according to claim 5, characterized in that the target gas is a product gas obtained by gasifying a fossil fuel by a gasification furnace.

9. The mercury removal system according to claim 2, characterized in that the system further comprises
a hydrogen sulfide absorption tower for introducing thereinto a water-washed gas sent from the water washing tower and absorbingly removing hydrogen sulfide from the water-washed gas by using an absorbing solution containing an amine compound, and
a second flash drum for flashing the absorbing solution discharged from the hydrogen sulfide absorption tower to separate the absorbing solution into a gas component and an absorbing solution to be sent to a regeneration tower.

10. The mercury removal system according to claim 2, characterized in that the target gas is a product gas obtained by gasifying a fossil fuel by a gasification furnace.

11. The mercury removal method according to claim 6, characterized in that the method further comprises
a hydrogen sulfide absorption step of absorbingly removing hydrogen sulfide from a water-washed gas sent and introduced from the water washing step by using an absorbing solution containing an amine compound, and
a second flash step of flashing the absorbing solution discharged from the hydrogen sulfide absorption step to separate the absorbing solution into a gas component and an absorbing solution to be sent to a regeneration tower.

12. The mercury removal method according to claim 6, characterized in that the target gas is a product gas obtained by gasifying a fossil fuel by a gasification furnace.

* * * * *

UNITED STATES PATENT AND TRADEMARK OFFICE
CERTIFICATE OF CORRECTION

PATENT NO. : 7,871,586 B2
APPLICATION NO. : 11/921683
DATED : January 18, 2011
INVENTOR(S) : Masahiro Harada et al.

It is certified that error appears in the above-identified patent and that said Letters Patent is hereby corrected as shown below:

ON THE TITLE PAGE:

Correct item (73), Assignees, to read as follows:

-- (73) Assignees: Mitsubishi Heavy Industries, Ltd., Tokyo (JP); Clean Coal Power R&D Co., Ltd., Iwaki-shi (JP); Hokkaido Electric Power Company, Inc., Sapporo-shi (JP); Tohoku Electric Power Co., Inc., Sendai-shi (JP); The Tokyo Electric Power Company Inc., Tokyo (JP); Chubu Electric Power Co., Inc., Nagoya-shi (JP); Hokuriku Electric Power Company, Toyama-shi (JP); The Kansai Electric Power Co., Inc., Osaka-shi (JP); The Chugoku Electric Power Co., Inc., Hiroshima-shi (JP); Shikoku Electric Power Co., Inc., Takamatsu-shi (JP); Kyushu Electric Power Co., Inc., Fukuoka-shi (JP); Electric Power Development Co., Ltd., Tokyo (JP); Central Research Institute of Electric Power Industry, Tokyo (JP) --.

Signed and Sealed this
Third Day of May, 2011

David J. Kappos
*Director of the United States Patent and Trademark Office*